United States Patent
Konrad et al.

(10) Patent No.: US 7,238,428 B2
(45) Date of Patent: Jul. 3, 2007

(54) POLYESTER FILM HAVING IMPROVED OXYGEN BARRIER AND POLY(M-XYLENEADIPAMIDE)-CONTAINING BASE LAYER, PROCESS FOR ITS PRODUCTION AND ITS USE

(75) Inventors: Matthias Konrad, Hofheim (DE); Herbert Peiffer, Mainz (DE); Gottfried Hilkert, Saulheim (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 0 days.

(21) Appl. No.: 10/757,746

(22) Filed: Jan. 15, 2004

(65) Prior Publication Data

US 2004/0146718 A1    Jul. 29, 2004

(30) Foreign Application Priority Data

Jan. 21, 2003  (DE)  .............. 103 02 034

(51) Int. Cl.
   *B32B 27/36*  (2006.01)
   *B28B 1/16*  (2006.01)

(52) U.S. Cl. .............. 428/480; 428/474.4; 428/475.2; 427/133

(58) Field of Classification Search ............. 428/474.4, 428/474.7, 475.2, 480; 427/133
See application file for complete search history.

(56) References Cited

U.S. PATENT DOCUMENTS

| 4,957,980 | A | * | 9/1990 | Kobayashi et al. | ......... 525/425 |
| 5,695,839 | A | | 12/1997 | Yamada et al. | |
| 2004/0146725 | A1 | * | 7/2004 | Konrad et al. | ........... 428/475.2 |
| 2004/0146727 | A1 | * | 7/2004 | Klein et al. | ................. 428/480 |
| 2004/0146750 | A1 | * | 7/2004 | Klein et al. | ........... 428/694 SG |

FOREIGN PATENT DOCUMENTS

| EP | 0 602 964 A1 | 6/1994 |
| EP | 0 952 176 A1 | 10/1999 |
| JP | 2001-347592 | 12/2001 |
| WO | WO 99/62694 A1 | 12/1999 |
| WO | WO 02/38673 A2 | 5/2002 |

OTHER PUBLICATIONS

XP002276539 Abstract, A, Toyobo KK, Nov. 16, 1983.
XP002276540 Abstract, A, Unitika Ltd., Jan. 9, 2001.

* cited by examiner

*Primary Examiner*—Thao Tran
(74) *Attorney, Agent, or Firm*—ProPat, L.L.C.

(57) ABSTRACT

Biaxially oriented polyester films which have a polyester-containing base layer (B) which additionally comprises poly(m-xyleneadipamide) and at least one overlayer (A), and whose average roughness is preferably from 10 to 100 nm and whose gloss is greater than 100, feature improved optical properties and very good barrier properties, especially toward passage of oxygen, and are therefore suitable as packaging materials for foods or other consumable items.

18 Claims, No Drawings

POLYESTER FILM HAVING IMPROVED OXYGEN BARRIER AND POLY(M-XYLENEADIPAMIDE)-CONTAINING BASE LAYER, PROCESS FOR ITS PRODUCTION AND ITS USE

FIELD OF THE INVENTION

The invention relates to a multilayer, transparent, biaxially oriented polyester film having a base layer (B) and, applied to this base layer (B), at least one overlayer (A). In addition to polyester, the base layer (B) comprises, as an additional polymer, poly(m-xyleneadipamide) (MXD6). The invention further relates to a process for producing the film and to its use.

BACKGROUND OF THE INVENTION

Transparent, biaxially oriented polyester films which feature improved barrier properties are disclosed by the prior art. In most cases, the films obtain their improved barrier properties offline after the production by a further processing step. Examples thereof are extrusion coating, coating or lamination with barrier materials, coating under reduced pressure with metals or with ceramic substances, or plasma polymerization in conjunction with vacuum coating.

An exception from this is the process described in detail in WO 99/62694, in which a multilayer, coextruded polyester film which comprises at least one layer of EVOH (ethylene-vinyl alcohol) is simultaneously biaxially stretched. The film features good mechanical properties, but in particular good barrier properties against the passage of oxygen. The best value specified in the document for the achievable oxygen transmission rate (OTR) is 5 $cm^3/(m^2 \cdot bar \cdot d)$. A disadvantage of the process is that regrind obtained in the course of the production cannot be fed back to the process without the film losing its good optical properties.

A further exception is the biaxially oriented film which is described in JP 2001-347592 and consists of a mixture of polyethylene terephthalate and poly(m-xyleneadipamide) (MXD6). The proportion of poly(m-xyleneadipamide) (MXD6) in the film is between 10 and 40% by weight, and the corresponding fraction of polyethylene terephthalate is between 60 and 90% by weight. The film is simultaneously biaxially stretched. It features good mechanical properties, high thermal stability, but in particular a good barrier with regard to the permeation of oxygen. The film achieves an OTR which is less than 30 $cm^3/(m^2 \cdot bar \cdot d)$. In addition, the film features low opacity. The document specifies a value for the opacity which is below 15%. A disadvantage of the film is its two rough surfaces which result from the mixing incompatibility of the two raw materials, polyethylene terephthalate and poly(m-xyleneadipamide (MXD6). The high roughness values result in the film losing its gloss and obtaining a matt appearance which is undesired for many applications in the packaging industry. A further disadvantage is that the film, because of its high roughness, cannot as efficiently be printed, metallized or coated as films which consist, for example, only of polyethylene terephthalate. The high roughness of the two film surfaces makes the thickness distribution of additionally applied layers (printing inks, metals, varnish, ceramic materials) inadequate. As a result, the physical properties of these layers likewise worsen.

SUMMARY OF THE INVENTION

It is an object of the present invention to provide a biaxially oriented polyester film which features very good barrier properties, especially toward the passage of oxygen. It should no longer have the disadvantages of the prior art films and should in particular have the following features:
  at least one of the two film surfaces has roughness values which are so low that the film has, for example, good printability, good metallizability and good coatability, without the effect of this additional functional layer being impaired;
  at least one of the two film surfaces has an appropriately high gloss, so that the film can be used for application in packaging without significant restrictions;
  the film can be produced economically, also meaning, for example, that the film can be produced using stretching processes which are customary in industry, without having to be restricted to the expensive simultaneous stretching process;
  the guarantee in the production of the film that the regrind can be fed back to the extrusion in an amount of up to 60% by weight, without the physical and optical properties of the film, but in particular the barrier toward oxygen, being significantly adversely affected.

On the other hand, the other properties which are features of polyester films should at the same time not worsen. These include, for example, the mechanical and the thermal properties, the winding behavior and the processibility of the film, in particular in the printing, laminating or the coating with metallic or ceramic materials.

This object is achieved by a biaxially oriented polyester film which has a base layer (B) and at least one overlayer (A), wherein the base layer (B) comprises poly(m-xyleneadipamide) (MXD6).

DETAILED DESCRIPTION OF THE INVENTION

The base layer (B) also comprises thermoplastic polyester, preferably at least 50% thereof, based on the weight of the layer (B). The proportion of poly(m-xyleneadipamide) in the base layer is preferably from 4 to 50% by weight, based on the weight of the layer (B). The overlayer (A) preferably has an average roughness $R_a$ of less than 100 nm, in particular from 10 to 100 nm. The layer (A) preferably contains, if any, less than 0.5% by weight of fillers, based on the weight of the layer (A). The gloss of this overlayer is preferably greater than 100.

Poly(m-xyleneadipamide) (MXD6), also referred to as poly-m-xylyleneadipamide or PA-MXD6, is a polycondensation product (polyarylamide) of m-xylylenediamine and adipic acid and is offered on the market in various types which are all suitable in principle for the inventive purpose. Preference is given to types having a melt viscosity of less 2000 poises.

The biaxially oriented, transparent polyester film of the present invention, compared to prior art films, has improved optical properties, in particular increased gloss. In addition, the film features outstanding barrier properties, in particular toward oxygen.

The gloss of the film surface (A) is preferably greater than 100 at an angle of incidence of 20°. In a preferred embodiment, the gloss of this side is more than 110 and in a particularly preferred embodiment more than 120. This film surface is therefore especially suitable for further functional coating, for printing or for metalization. The high gloss of the film is transferred to the print or the applied metal layer and thus confers on the film the desired commercially effective appearance.

The opacity of the film is preferably less than 20%. In a preferred embodiment, the opacity of the film is less than 15% and in a particularly preferred embodiment is less than 10%. The low opacity makes the film especially suitable for application in packaging.

The film has an OTR of preferably less than 50 $cm^3 \cdot m^{-2} \cdot d^{-1} \cdot bar^{-1}$, preferably less than 40 $cm^3$ $cm^3 \cdot m^{-2} \cdot d^{-1} \cdot bar^{-1}$ and more preferably less than 30 $cm^3$ $cm^3 \cdot m^{-2} \cdot d^{-1} \cdot bar^{-1}$.

The film of the present invention preferably consists of the inventive base layer (B) and the inventive overlayer (A). In this case, the film has a two-layer structure. In addition, it may also have a three-layer or multilayer structure. In that case, it consists of the inventive base layer (B), the two inventive overlayers (A) and (C) and optionally further intermediate layers (D, E, F, . . . ). The overlayers (A) and (C), and also the intermediate layers, may be the same or different.

The base layer of the film preferably consists of at least 50% by weight of thermoplastic polyester (=component I). Suitable for this purpose are, for example, polyesters of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclohexane and terephthalic acid (=poly-1,4-cyclohexane-dimethylene terephthalate, PCDT), and also of ethylene glycol, naphthalene-2,6-dicarboxylic acid and biphenyl-4,4'-dicarboxylic acid (=polyethylene 2,6-naphthalate bibenzoate, PENBB). Preference is given to polyesters which consist of at least 90 mol %, more preferably at least 95 mol %, of ethylene glycol and terephthalic acid units, or of ethylene glycol and naphthalene-2,6-dicarboxylic acid units. The remaining monomer units stem from other diols or other dicarboxylic acids. Advantageously, copolymers or mixtures or blends of the homo- and/or copolymers mentioned may also be used for component I of the base layer (B).

It is particularly advantageous for the last-mentioned case when component I used in the base layer (B) is based on isophthalic acid and terephthalic acid or based on terephthalic acid and naphthalene-2,6-dicarboxylic acid. In this case, the producibility of the film is good and the optical properties of the film, and also the barrier properties of the film which are achieved, are particularly good.

In this case, the base layer (B) comprises substantially, as component I, a polyester copolymer which is composed predominantly of isophthalic acid and terephthalic acid units and/or terephthalic acid and naphthalene-2,6-dicarboxylic acid units and of ethylene glycol units, and, as component II, the aforementioned poly(m-xyleneadipamide) (MXD6).

The preferred copolyesters which provide the desired properties of the film (in particular the optical properties, joint stretchability) are those which are composed of terephthalate and isophthalate units and of ethylene glycol units. The proportion of ethylene terephthalate in these copolymers is preferably from 40 to 97 mol % and the corresponding proportion of ethylene isophthalate is from 60 to 3 mol %. Preference is given to copolyesters in which the proportion of ethylene terephthalate is from 50 to 95 mol % and the corresponding fraction of ethylene isophthalate is from 50 to 5 mol %, and greater preference is given to copolyesters in which the proportion of ethylene terephthalate is from 60 to 90 mol % and the corresponding proportion of ethylene isophthalate is from 40 to 10 mol %.

Suitable other aliphatic diols which may be constituents of the polyesters according to the invention are, for example, diethylene glycol, triethylene glycol, aliphatic glycols of the general formula HO—$(CH_2)_n$—OH where n is an integer from 3 to 6 (in particular propane-1,3-diol, butane-1,4-diol, pentane-1,5-diol and hexane-1,6-diol), or branched aliphatic glycols having up to 6 carbon atoms, cycloaliphatic, optionally heteroatom-containing diols having one or more rings. Of the cycloaliphatic diols, mention should be made of cyclohexanediols (in particular cyclohexane-1,4-diol). Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —$SO_2$—. In addition, bisphenols of the formula HO—$C_6H_4$—$C_6H_4$—OH are also very suitable.

Suitable other aromatic dicarboxylic acids which may be constituents of the polyesters according to the invention are preferably benzenedicarboxylic acids, naphthalene-dicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$C_{19}$)alkanedioic acids are particularly suitable, and the alkane moiety may be straight-chain or branched.

The polyesters may be prepared by the known transesterification process. This starts from dicarboxylic esters and diols which are reacted with the customary transesterification catalysts, such as zinc salts, calcium salts, lithium salts and manganese salts. The intermediates are then polycondensed in the presence of generally customary polycondensation catalysts such as antimony trioxide or titanium salts. The preparation may equally well be effected by the direct esterification process in the presence of polycondensation catalysts. This starts directly from the dicarboxylic acids and the diols.

According to the invention, a further component contained in the base layer (B) is poly(m-xyleneadipamide) (MXD6) (=component II) in an amount of preferably from 4 to 50% by weight, in particular in an amount of from 5 to 40% by weight and more preferably in an amount from 6 to 30% by weight, based on the weight of the base layer (B). At a proportion by weight of poly(m-xyleneadipamide) (MXD6) of less than 4% in the base layer (B), the positive effect on the oxygen barrier is inadequate under some circumstances. On the other hand, although the barrier becomes even better with a proportion by weight of poly(m-xyleneadipamide) (MXD6) of greater than 50% in the base layer (B), the producibility of the film and in particular the regrind usability of the film may worsen. Regrind means offcut material occurring in the film production which is fed back to the production process.

For the processing of the polymers, it has been found to be favorable when the poly(m-xyleneadipamide) (MXD6) is selected in such a way that there is not too great a difference in the viscosities of the particular polymer melts. Otherwise, additional elevations/projections, disruptions to flow or streak formation are under some circumstances to be expected on the finished film. Moreover, the polymers then tend to separate. In accordance with the experiments carried out here, the melt viscosity of the poly(m-xyleneadipamide) (MXD6) should preferably be below certain values. Very good results are obtained in the context of the present invention when the melt viscosity for the MXD6 is less than 2000 poises (measured in a capillary rheometer of diameter 0.1 mm, length 10 mm and load 10 kg/cm$^2$, melt temperature 280° C.), preferably less than 1800 poises and more preferably less than 1600 poises.

The poly(m-xyleneadipamide) (MXD6) is appropriately incorporated into the film either as pure granules or as a granulated concentrate (PET/MXD6 mixture masterbatch). To this end, the polyester granules are premixed with the poly(m-xyleneadipamide) (MXD6) or the poly(m-xyleneadipamide) (MXD6) masterbatch and subsequently fed to the extruder. In the extruder, the components are mixed further and heated to processing temperature. It is appropriate for the process according to the invention when the extrusion temperature is above the melt temperature $T_S$ of the poly(m-xyleneadipamide (MXD6), generally at least 5° C., preferably from 10 to 50° C., but in particular from 20 to 40° C., above the melt temperature of the poly(m-xyleneadipamide) (MXD6). A preferred extrusion unit for the processing of the mixture or else for the preparation of the masterbatch of components 1 and 11 is the twin-screw extruder.

The film of the present invention has an at least two-layer structure. In that case it consists of the inventive base layer (B) and the overlayer (A) disposed on it. The film may also have additional layers, which are referred to as overlayers or intermediate layers. Typical film structures in that case are ABA or ABC where A and. C are appropriate overlayers which may be the same or different.

The (polyester) polymers used for the overlayers may in principle be the same as for the base layer B. In addition, other materials may also be present in these overlayers, in which case the overlayers preferably consist of a mixture of polymers, copolymers or homopolymers, which contains ethylene isophthalate units and/or ethylene 2,6-naphthalate units and/or ethylene terephthalate units. Up to 10 mol % of the polymers may consist of further comonomers.

Advantageously, further components used for the overlayers may also be copolymers or mixtures or blends of homo- and/or copolymers.

It is particularly appropriate to use a polyester copolymer based on isophthalic acid and terephthalic acid. In this case, the optical properties of the film are particularly good.

In this case, the overlayers or one overlayer of the film comprises substantially a polyester copolymer which is composed predominantly of isophthalic acid and terephthalic acid units and of ethylene glycol units. The remaining monomer units stem from other aliphatic, cycloaliphatic or aromatic diols or other dicarboxylic acids, as may also occur in the base layer. The preferred copolyesters which provide the desired properties of the film (in particular the optical properties) are those which are composed of terephthalate and isophthalate units and of ethylene glycol units. The proportion of ethylene terephthalate is preferably from 40 to 97 mol % and the corresponding proportion of ethylene isophthalate is from 60 to 3 mol %. Preference is given to copolyesters in which the proportion of ethylene terephthalate is from 50 to 90 mol % and the corresponding proportion of ethylene isophthalate is from 50 to 10 mol %, and greater preference is given to copolyesters in which the portion of ethylene terephthalate is from 60 to 85 mol % and the corresponding proportion of ethylene isophthalate is from 40 to 15 mol %.

In addition, the overlayers may also comprise poly(m-xyleneadipamide) (MXD6), as has been described in detail for the base layer (B). The proportion by weight of poly(m-xyleneadipamide) (MXD6) in the overlayers is in that case appropriately from 0.1 to 20% by weight, preferably from 0.3 to 15% by weight and more preferably from 0.5 to 10% by weight, based on the weight of the particular overlayer. In a preferred embodiment of the invention, the overlayers contain no poly(m-xyleneadipamide) (MXD6).

The thickness of the overlayer is preferably greater than 0.5 µm and is preferably in the range from 1.0 to 20 µm and more preferably in the range from 2.0 to 10 µm.

The base layer (B) and the overlayers (A) and (C) and any intermediate layers may additionally comprise customary additives, for example stabilizers and antiblocking agents. They are appropriately added to the polymer or to the polymer mixture before the melting. The stabilizers used are, for example, phosphorus compounds, such as phosphoric acid or phosphoric esters. Typical antiblocking agents (also referred to in this context as pigments or fillers) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or crosslinked polystyrene or acrylate particles.

The additives selected may also be mixtures of two or more different antiblocking agents or mixtures of antiblocking agents of the same composition but different particle size. The particles may be added to the individual layers in the customary concentrations, for example as a glycolic dispersion during the polycondensation or via masterbatches in the extrusion. Advantageous pigment concentrations have been found to be from 0.0001 to 5% by weight, based on the weight of the layer provided with them. A detailed description of antiblocking agents can be found, for example, in EP-A-0 602 964.

The filler content (pigment content) in the overlayer (A) is preferably less than 0.5% by weight, in particular less than 0.4% by weight and more preferably less than 0.3% by weight, based on the weight of the overlayer (A).

The total thickness of the polyester film according to the invention may vary within wide limits and depends on the intended application. It is generally from 6 to 300 µm, preferably from 8 to 200 µm, more preferably from 10 to 100 µm, and the base layer B has a fraction of preferably from 40 to 99% of the total thickness.

The present invention also provides a process for producing the film. To produce the base layer B, the particular components (component I=polyester homo- or polyester copolymer or mixtures thereof, component II=poly(m-xyleneadipamide) (MXD6) granules) are appropriately fed directly to the extruder. The materials can be extruded at from about 270 to 300° C. From a process technology point of view (mixing of the different polymers), it has been found to be particularly favorable when the extrusion of the polymers for the base layer (B) is carried out on a twin-screw extruder having degassing means.

The polymers for the overlayers are appropriately fed to the (coextrusion) system via a further extruder; as a result of fundamental considerations preference is also to be given here to the twin-screw extruder over the single-screw extruder. The melts are shaped in a multilayer nozzle to give flat melt films and layered one on top of the other.

Subsequently, the multilayer film is drawn off and solidified with the aid of a chill roll and optionally further rolls. This prefilm is then biaxially stretched and subsequently heat-set.

The biaxial stretching is carried out sequentially. Preference is given to stretching first in longitudinal direction (i.e. in machine direction) and subsequently in transverse direction (i.e. at right angles to machine direction). The stretching in the longitudinal direction can be carried out with the aid of two rolls rotating at different rates in accordance with the desired stretching ratio. For transverse stretching, an appropriate tenter frame is generally used.

The temperature at which the stretching is carried out may vary within a relatively wide range and depends upon the desired properties of the film. In general, the stretching in longitudinal direction is carried out within a temperature range of from 80 (heating temperature from 80 to 130° C.) to 130° C. (stretching temperatures 80-130° C., depending on the stretching ratio) and the transverse stretching within a temperature range of from 90 (beginning of the stretching) to 140° C. (end of the stretching). The longitudinal stretching ratio is preferably in the range from 2.0:1 to 5.2:1, in particular from 2.3:1 to 4.8:1. The transverse stretching ratio is preferably in the range from 2.5:1 to 5.0:1, in particular from 2.7:1 to 4.5:1.

Before the transverse stretching, one or both surface(s) of the film may be coated inline by the known processes. The inline coating may lead, for example, to improved adhesion of a metal layer or of a printing ink which might be applied, but also to improvement in the antistatic behavior, in the processing performance, but also to further improvement of the barrier, for example by application of barrier coatings which comprise, for example, EVOH, PVOH or the like. Preference is given in that case to applying such layers to the smoother (=less rough) surface of the film.

For the production of a film having very particularly good optical properties (=very low opacity) and having good process reliability (few tears), it has been found to be favorable when the planar orientation Δp of the film is less than Δp=0.160, preferably less than Δp=0.158 and very preferably less than Δp=0.156. The process parameters in the longitudinal stretching and in the transverse stretching have a significant influence on the planar orientation Δp of the finished film. The most important process parameters influencing the planar orientation include the stretching ratios in longitudinal and in transverse direction ($\lambda_{MD}$ and $\lambda_{TD}$) and the stretching temperatures in longitudinal and transverse direction ($T_{MD}$ and $T_{TD}$). When, for example, a machine is used to obtain a planar orientation of the film produced of Δp=0.165 with the parameter set $\lambda_{MD}$=4.5 and $\lambda_{TD}$=4.0 and $T_{MD}$=118° C. and $T_{TD}$=125° C., increasing the longitudinal stretching temperature to $T_{MD}$=125° C. or increasing the transverse stretching temperature to $T_{TD}$=135° C. or reducing the longitudinal stretching ratio to $\lambda_{MD}$=4.3 or reducing the transverse stretching ratio to $\lambda_{TD}$=3.7 results in a planar orientation Δp being obtained which is within the desired range. The temperatures specified relate, in the case of longitudinal stretching, to the particular roll temperatures, and, in the case of the transverse stretching, to the film temperatures which have been measured by means of IR.

In the subsequent heat-setting, the film is kept at a temperature of from approx. 150 to 250° C. over a period of from about 0.1 to 10 s. Subsequently, the film is wound up in a customary manner.

A further advantage of the invention is that the production costs of the film according to the invention are not significantly above those of a film of standard polyester raw materials. In addition, it is guaranteed in the course of the production of the film that offcut material, which occurs inherently in the operation of film production, can be reused for the film production as regrind in an amount of up to approx. 60% by weight, preferably from 10 to 50% by weight, based in each case on the total weight of the film, without the physical properties of the film being significantly adversely affected.

The film according to the invention is therefore especially suitable for packaging foods or other consumable items. The film features outstanding barrier properties, in particular toward oxygen.

The film according to the invention is additionally outstandingly suitable for metallizing or vacuum-coating with ceramic substances (e.g. $SiO_x$). It then has the very particular feature of outstanding barrier properties, not only toward oxygen but also toward steam.

The table which follows (Table 1) once again summarizes the most important inventive and preferred film properties, and "inventive" is to be regarded as a preferred embodiment.

TABLE 1

|  | Inventive range | Preferred | More preferred | Units | Test method |
|---|---|---|---|---|---|
| Base layer B |  |  |  |  |  |
| Component I (= thermoplastic polyester) | 50 to 96 | 60 to 95 | 70 to 94 | % by wt. |  |
| Component II = poly(m-xyleneadipamide) (MXD6) | 4 to 50 | 5 to 40 | 6 to 30 | % by wt. |  |
| Melt viscosity of the poly(m-xyleneadipamide) (MXD6) used | <2000 | <1800 | <1600 | poise | in a capillary rheometer, 280° C. |
| Properties of the overlayer (A) |  |  |  |  |  |
| Filler concentration | <5000 | <4000 | <3000 | ppm |  |
| Roughness $R_a$ | 10 to 100 | 15 to 90 | 20 to 80 | nm | DIN 4768 |
| Gloss (20°) | >100 | >110 | >120 |  | DIN 67530 |
| Thickness | >0.5 | >1.0 | >2.0 | μm |  |
| Film properties |  |  |  |  |  |
| Permeation coefficient for oxygen | <50 | <40 | <30 | $cm^3 \cdot [12 \mu m]/(m^2 \cdot d \cdot bar)$ | DIN 53380, Part 3, climate B |
| OTR (of a film of thickness 12 μm) | <50 | <40 | <30 | $cm^3/(m^2 \cdot d \cdot bar)$ | DIN 53380, Part 3, climate B |
| Planar orientation Δp | <0.160 | <0.158 | <0.156 |  | as described |
| Opacity of the film | <20 | <15 | <10 | % | ASTM-D 1003-52 |
| Thickness of the film | 6 to 300 | 8 to 200 | 10 to 100 | μm |  |

Test methods

To characterize the raw materials and the films, the following methods were used:

DIN=Deutsches Institut für Normung (German Institute for Standardization)

ASTM=American Society for Testing and Materials (1) Oxygen Transmission Rate (OTR)

The oxygen barrier was measured using an OXTRAN® 100 from Mocon Modern Controls (USA) in accordance with DIN 53 380, Part 3 (23° C., 50% relative atmospheric humidity on both sides of the film). The OTR was measured in each case on film of thickness 12 μm.

(2) Opacity

The determination of the opacity of the film was based on ASTM-D 1003-52.

(3) SV Value (Standard Viscosity)

The standard viscosity, SV (DCA), is measured in dichloroacetic acid, based on DIN 53 726. The intrinsic viscosity (IV) is calculated as follows from the standard viscosity:

$$IV(DCA)=6.907 \cdot 10^{-4} SV(DCA)+0.063096$$

(4) Gloss

The gloss was determined to DIN 67530. The reflector value was measured as a characteristic optical parameter for the surface of a film. Based on the standards ASTM-D 523-78 and ISO 2813, the angle of incidence was set to 20° or 60°. A light beam hits the flat test surface at the angle of incidence set and is reflected or scattered by it. The light rays incident on the photoelectronic detector are displayed as a proportional electrical quantity. The measurement is dimensionless and has to be quoted together with the angle of incidence.

(5) Roughness

The roughness $R_a$ of the film was determined to DIN 4768 at a cutoff of 0.25 mm.

However, measurement was not effected on a glass plate, but rather in a ring. In the ring method, the film is clamped into a ring, so that neither of the two surfaces touches a third surface (for example glass).

(6) Planar Orientation Δp

The planar orientation is determined via the measurement of the refractive indices using an Abbe refractometer (Kruss Optronic, Germany). The planar orientation is always measured on the glossier side of the film. The determination of the refractive indices is already reproduced in detail, for example, in EP-A-0 952 176, page 10. Reference is therefore explicitly made here to this document. The orientation values are then calculated from the refractive indices by the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

EXAMPLES

The examples which follow illustrate the invention. The products used (brands and manufacturer) are each specified only once and then also relate to the examples which follow.

Example 1

Chips of polyethylene terephthalate (prepared by the transesterification process using Mn as the transesterification catalyst, Mn concentration in the polymer: 100 ppm; dried to a residual moisture content of below 100 ppm at a temperature of 150° C.) and poly(m-xyleneadipamide) (MXD6), likewise dried to a residual moisture content of below 100 ppm at a temperature of 150° C., were fed in a mixing ratio of 85:15 to the extruder (single-screw extruder) for the base layer (B). Chips of polyethylene terephthalate and particular fillers were likewise fed to the extruders for the two overlayers (A) and (C). Coextrusion and subsequent stepwise orientation in longitudinal and in transverse direction were used to produce a transparent, three-layer film having ABC structure and a total thickness of 12 μm. The thickness of the overlayers was in each case 1.5 μm.

Overlayer (A):

100% by weight of polyester raw material having an SV value of 800 and consisting of 99.9% by weight of polyethylene terephthalate and 0.1% by weight of silica particles (SYLYSIA® 320 from Fuji/Japan) having a $d_{50}$ value of 2.5 μm.

Base Layer (B):

85.0% by weight of polyethylene terephthalate having an SV value of 800

15% by weight of poly(m-xyleneadipamide) (MXD6) from Mitsubishi Gas Chemical Co., product name NYLON MXD6® 6001 having a melt viscosity of 1400 poises Overlayer (C), Mixture of:

93.0% by weight of polyethylene terephthalate having an SV value of 800

7.0% by weight of masterbatch of 97.75% by weight of polyethylene terephthalate, 1.0% by weight of SYLOBLOC® 44H (synthetic $SiO_2$ from Grace, USA) and 1.25% by weight of AEROSILI® TT 600 (pyrogenic $SiO_2$ from Degussa, Germany)

The production conditions in the individual process steps were:

| Extrusion | Temperatures | A layer: | 290° C. |
|---|---|---|---|
| | | B layer: | 290° C. |
| | | C layer: | 290° C. |
| | Temperature of the takeoff roll | | 25° C. |
| Longitudinal stretching: | Stretching temperature: | | 125° C. |
| | Longitudinal stretching ratio: | | 4.1 |
| Transverse stretching: | Stretching temperature: | | 130° C. |
| | Transverse stretching ratio | | 3.9 |
| Setting: | Temperature: | | 230° C. |
| | Time: | | 3 s |

The film had the required high gloss, the required low opacity and the required low OTR. In addition, the film could be prepared very efficiently, i.e. without tears, and also exerted the desired processing performance.

Example 2

A film was produced in accordance with Example 1. The overlayer thickness of layer (A) was increased from 1.5 μm to 2.5 μm. This allowed the gloss of this surface to be again increased.

Example 3

A film was produced in accordance with Example 2. In this case, the overlayer (A) contained no filler. This allows the gloss of this surface to be increased again.

Comparative Example CE1

A film was produced in accordance with Example 1 of JP 2001-347592. The roughness values of this film are too high, and the gloss of the film is not within the inventive range.

The properties and the structure of the films produced in accordance with the examples and the comparative examples are compiled in table 2.

TABLE 2

| Examples | Film thickness (μm) | Film structure | Thickness of the overlayer (A) (μm) | Poly(m-xylene-adipamide) (MXD6) content in base layer B % by wt. | Gloss of the surface (A) (20°) | Roughness $R_a$ of the surface (A) μm | Permeation coefficient of oxygen ($cm^3 \cdot 12\,\mu m$/ $m^2 \cdot bar \cdot d$) | OTR ($cm^3$/ $m^2 \cdot bar \cdot d$) | Opacity of the film (%) |
|---|---|---|---|---|---|---|---|---|---|
| Example 1 | 12 | ABC | 1.5 | 15 | 130 | 65 | 16 | 16 | 6 |
| Example 2 | 12 | ABC | 2.5 | 15 | 150 | 45 | 16 | 16 | 5 |
| Example 3 | 12 | ABC | 1.5 | 15 | 160 | 35 | 16 | 16 | 4 |
| CE1 | 12 | B | | 20 | 65 | 170 | 22 | 22 | 8 |

The invention claimed is:

1. A biaxially oriented polyester film which has a base layer (B) and comprises at least one overlayer (A),
    wherein the base layer (B) comprises
    (i) polyester consisting essentially of polyethylene terephthalate, polyethylene 2,6-naplithalate, poly-1,4-cyolohexane-dimethylene terephthalate, polyethylene 2,6-naphthalate bibenzoate and mixtures thereof;
    (ii) poly(m-xyleneadipamide) having a melt viscosity smaller than 2000 poises and
    said overlayer (A) comprises said polyester and, optionally, up to 20% by weight of said poly(m-xyleneadipamide), based on the weight of the overlayer (A), and further exhibits a gloss of greater than 100,
    said polyester film exhibiting an oxygen transmission (OTR) smaller than 50 $cm^3$ $m^{-2}$ $d^{-1}$ $bar^{-1}$ and an opacity of less than 20%,
    said overlayer (A) containing from 0.0001 to 0.5 wt % antiblocking agents, based on the weight of overlayer (A).

2. The polyester film as claimed in claim 1, wherein the base layer (B) comprises from 4 to 50% by weight of poly(m-xyleneadipamide), based on the weight of the base layer (B).

3. The polyester film as claimed in claim 1, wherein not only the base layer (B) but also the overlayer (A) comprises poly(m-xyleneadipamide).

4. The polyester film as claimed in claim 1, wherein the polyester of the base layer (B) has at least one of either ethylene glycol units and terephthalic acid units, or ethylene glycol units and naphthalene-2,6-dicarboxylic acid units.

5. The polyester film as claimed in claim 1, wherein the polyester of the base layer (B) has terephthalic acid units, and ethylene glycol units.

6. The polyester film as claimed in claim 1, wherein polyethylene terephthalate is used as polyester of the base layer (B).

7. The polyester film as claimed in claim 1, which has an A-B-C layer structure, A and C being overlayers which may be identical or different.

8. The polyester film as claimed in claim 1, wherein the overlayers comprise the polyester used for the base layer (B).

9. The polyester film as claimed in claim 1, which has an oxygen transmission (OTR) smaller than 40 $cm^3 \cdot m^{-2} \cdot d^{-1} \cdot bar^{-1}$.

10. The polyester film as claimed in claim 1, which has an opacity smaller than 15% and a planar orientation of less than 0.160.

11. The polyester film as claimed in claim 1, wherein the overlayer (A) has an average roughness $R_a$ smaller than 100 nm.

12. The polyester film as claimed in claim 1, wherein the overlayer (A) further comprises filler and the filler concentration in the overlayer (A) is less than 0.5% by weight.

13. A process for producing a polyester film as claimed in claim 1, encompassing the steps of
    a) producing a multilayer film by coextrusion and shaping the melts to give flat melt films
    b) biaxial stretching of the film, and
    c) heat-setting of the stretched film.

14. Packaging film comprising polyester film as claimed in claim 1.

15. A polyester film according to claim 1, wherein said overlayer (A) does not include poly(m-xyleneadipamide) and said overlayer (A) exhibits a gloss of greater than 110.

16. A polyester film according to claim 1, wherein the base layer (B) consists essentially of polyester, poly(m-xyleneadipamide) and at least one additive selected from one or more stabilizers and one or more antiblocking agents.

17. A biaxially oriented polyester film comprising a base layer (B) and at least one overlayer (A), said base layer (B) and overlayer (A) comprising
    (i) polyester consisting essentially of
        (a) one or more aromatic carboxylic acids selected from terephthalic acid, naphthalene-2,6-dicarboxylic acid, biphenyl-4,4'-dicarboxylic acid, and isophthalic acid and
        (b) one or more diols selected from 1,4-bishydroxymethylcyclohexane and ethylene glycol,
    (ii) poly(m-xyleneadipamide) having a melt viscosity smaller than 2000 poises and optionally
    (iii) an additive consisting essentially of
        (a) one or more stabilizers and/or
        (b) one or more antiblocking agents, wherein said polyester film exhibits an oxygen transmission (OTR) smaller than 50 cm$^3$ m$^{-2}$ d$^{-1}$ bar$^{-1}$ and an opacity of less than 20%, said overlayer (A) containing from 0.0001 to 0.5 wt % antiblocking agents, based on the weight of overlayer (A).

18. A biaxially oriented polyester film comprising a base layer (B) and at least one overlayer (A), the base layer (B) comprising (i) polyester consisting essentially of polyethylene terephthalate, polyethylene 2,6-naphthalate, poly-1,4-cyclohexane-dimethylene terephthalate, polyethylene 2,6-naphthalate bibenzoate and mixtures thereof; and (ii) from 4 to 30% by weight poly(m-xyleneadipamide), based on the weight of the base layer (B), said poly(m-xyleneadipamide) having a melt viscosity smaller than 2000 poises and said overlayer (A) comprising (i) said polyester and (ii) optionally, up to 20% by weight of said poly(m-xyleneadipamide), based on the weight of the overlayer (A), said overlayer (A) further exhibiting a gloss of greater than 100, wherein said polyester film exhibits an oxygen transmission (OTR) smaller than 50 cm$^3$ m$^{-2}$ d$^{-1}$ bar$^{-1}$ and an opacity of less than 10%.

\* \* \* \* \*